United States Patent [19]
Gotou

[11] Patent Number: 5,882,816
[45] Date of Patent: Mar. 16, 1999

[54] STRUCTURE OF BATTERY STORAGE PORTION FOR ELECTRONIC EQUIPMENT

[75] Inventor: Seiichirou Gotou, Shizuoka, Japan

[73] Assignee: NEC Corporation, Tokyo, Japan

[21] Appl. No.: 898,242

[22] Filed: Jul. 22, 1997

[30] Foreign Application Priority Data

Jul. 31, 1996 [JP] Japan ................................ 8-202601

[51] Int. Cl.⁶ .................................................. H01M 2/10
[52] U.S. Cl. ........................................... 429/100; 429/96
[58] Field of Search ...................................... 429/96, 100

[56] References Cited

U.S. PATENT DOCUMENTS 5,202,197   4/1993   Ansell et al. .

FOREIGN PATENT DOCUMENTS 7166461   6/1996   European Pat. Off. .
7-38934   2/1995   Japan .

*Primary Examiner*—John S. Maples
*Attorney, Agent, or Firm*—Sughrue, Mion, Zinn, Macpeak & Seas, PLLC

[57] ABSTRACT

A structure of a battery storage portion for an electronic equipment has a battery storage chamber which opens in a housing of the electronic equipment to store a battery, a battery cover which closes the opening of the battery storage chamber, and a lock handle means which engages with the battery cover to prevent the battery cover from dropping from the housing. The lock handle means includes a battery push-out piece projecting into the battery storage chamber to push out the battery which is stored toward the opening of the battery storage chamber.

4 Claims, 6 Drawing Sheets

STRUCTURE OF BATTERY STORAGE PORTION FOR ELECTRONIC EQUIPMENT

BACKGROUND OF THE INVENTION

1. Field of the Invention

The present invention relates to a housing structure for an electronic equipment, e.g., a personal paging receiver, and, more particularly, to the structure of a battery storage portion in the housing of an electronic equipment.

2. Description of the Prior Art

In an electronic equipment of this type, a compact cylindrical battery, e.g., AA, AAA, and N batteries, is often used as the power supply. These batteries are expendable supplies. To continuously use the equipment, the dead battery must be removed from the equipment and be exchanged for a new one. For this purpose, an opening portion serving as the battery inlet/outlet port is formed in the outer surface of the equipment housing, and the battery can be loaded in and unloaded from a battery storage chamber in the housing. The battery stored in the battery storage chamber will not drop because of a battery cover closing the opening portion of the housing.

FIG. 1 is a schematic exploded perspective view showing the structure of a general battery storage portion adopted in the conventional electronic equipment. An opening portion 22 having a size matching the size of a battery to be stored is usually formed in part of a housing 21, and a battery storage chamber 23 is formed to oppose this opening portion 22. The opening portion 22 can be closed with a battery cover 24 having a size matching the size of the opening portion 22. The battery cover 24 is formed by combining two thin plates into an L shape, and closes the opening portion of the housing to prevent the stored battery from dropping. A coil-type negative spring terminal 25 which comes into elastic contact with the negative terminal of the battery and a positive terminal 26 which comes into tight contact with the positive terminal of the battery are arranged on the two end portions of the battery storage chamber 23.

FIG. 2 is a sectional view taken along the line II—II of FIG. 1. When a battery X is stored in the battery storage chamber 23, it is held as its positive terminal is urged by a projection 26a projecting from the positive terminal 26b with the negative spring terminal 25.

To remove the battery X, the battery cover 24 is slid in the direction of an arrow G in FIG. 2 to open the opening portion 22, and the battery X is pulled out from the housing 21 by having the positive terminal end portion of the battery X caught on the nail or the like. Then, as indicated by an alternate long and two short dashes line in FIG. 2, the positive terminal of the battery X is released from the positive terminal 26, and the battery X is pushed by the negative spring terminal 25, so that it is held such that its positive terminal projects from the battery storage chamber 23. In this state, the projecting portion of the battery X is held again, so that the battery can be removed.

The spring used as the negative terminal of the housing is often a strong one in order to prevent instantaneous disconnection between the chamber terminal and the battery terminal caused by dropping impact of the equipment or a decrease in contact resistance between the chamber terminal and the battery terminal. Therefore, when removing the battery, if the battery is removed from the housing by having the positive terminal portion of the battery caught on the nail or the like, as in the conventional case, an excessive load is applied to the nail or the like, and the battery cannot sometimes be easily removed. In particular, in a small battery, the gap between the positive terminal of the battery and the housing is small, and it is often difficult to insert a nail or the like in this gap.

In order to solve the above problem, the present applicant has proposed the invention disclosed in Japanese Unexamined Patent Publication No. 7-38934. In this prior invention, as shown in FIG. 3, a projection 38 for pressing the battery is formed at a position of the inner surface of the housing of a battery cover 34 near the negative terminal of a battery X to project in the direction of thickness of the battery cover 34. A recessed portion 37 is formed in a surface of a battery storage chamber 33 that opposes an opening portion 32 to be near a negative spring terminal 35.

FIGS. 4A to 4C are sectional views taken along the line IV—IV of FIG. 3. FIG. 4A shows a state wherein the battery cover 34 is closed completely. At this time, the projection 38 does not act on the battery X. As the battery cover 34 is opened, the projection 38 becomes close to the battery X, as shown in FIG. 4B. When the battery cover 34 is further opened, the projection 38 comes into contact with the outer surface of the negative terminal of the battery X, as shown in FIG. 4C, to press this portion in a direction opposite to the opening portion 32. More specifically, the negative terminal portion of the battery X is urged against the recessed portion 37, and the positive terminal of the battery X projects from the housing 31 due to the reaction. As a result, the conventional operation of removing the battery X from the housing by having the positive terminal portion of the battery X caught on a nail or the like becomes unnecessary.

In the prior invention described above, the recessed portion 37 is formed in the battery storage chamber 33. When the negative terminal of the battery is urged against a portion opposite to the opening portion 32, the positive terminal of the battery can project from the housing 31, and the end portion of the battery need not be pulled out from the housing 31. However, the recessed portion 37 may adversely affect the outer appearance of the housing 31. Depending on the structure of the housing 31, the recessed portion 37 cannot be formed.

SUMMARY OF THE INVENTION

The present invention has been made in view of the above situations of the conventional technique, and has as its object to provide a new battery storage structure that facilitates an operation of removing a battery from the housing of an electronic equipment.

In order to achieve the above object, according to the basic aspect of the present invention, there is provided a structure of a battery storage portion for an electronic equipment, having a battery storage chamber which opens in a housing of the electronic equipment to store a battery, a battery cover which closes the opening of the battery storage chamber, and lock handle means which engages with the battery cover to prevent the battery cover from dropping from the housing, wherein the lock handle means comprises a battery push-out piece projecting into the battery storage chamber to push out the stored battery toward the opening of the battery storage chamber.

The housing of the electronic equipment according to the above basic aspect is formed with a lock handle mounting opening portion for fitting the lock handle means therein, and the lock handle means is mounted on the housing of the electronic equipment to be slidable in a direction parallel to an end face of the stored battery.

The lock handle means according to the above basic aspect is constituted by an outer plate portion engageable with the battery cover, engaging hooks formed on a lower surface of the outer plate portion to engage with side surface portions of the lock handle mounting opening portion formed in the housing, and the L-shaped battery push-out piece extending from the lower surface of the outer plate portion, and the battery push-out piece extends through a lock handle mounting opening portion formed in the housing and an opening portion for the battery push-out piece which is formed in the battery storage chamber.

The side surface portions of the lock handle mounting opening portion are formed with a plurality of engaging projections, and the lock handle means can be set still at a plurality of positions by engaging the engaging projections and the engaging hooks with each other.

According to the present invention, the battery push-out piece formed on the lock handle means projects into the battery storage chamber to be able to push out the stored battery toward the opening of the battery storage chamber.

The lock handle means fitted in the housing of the electronic equipment can slide in a direction perpendicular to the longitudinal direction of the battery stored in the housing of the electronic equipment.

The battery push-out piece formed on the lock handle means can extend through the lock handle mounting opening portion formed in the housing and the opening portion for the battery push-out piece which is formed in the battery storage chamber.

More specifically, while the battery storage chamber of the housing is open, when the lock handle means is slid in a direction perpendicular to the longitudinal direction of the battery, the battery push-out piece enters between the battery and a surface of the battery storage chamber which opposes the opening, and pushes out the battery toward the opening. Therefore, the battery projects from the battery storage chamber so that it can be easily removed from the housing.

As described above, in the structure of the battery storage portion for the electronic equipment according to the present invention, the positive terminal of the battery can be pushed out from the housing by operating the lock handle means. Therefore, the battery need not be pulled out by having a portion of the positive terminal of the battery caught on the nail or the like, and the operation of removing the battery from the battery storage chamber can be performed easily.

The operation of pushing out the battery can be performed by improving the lock handle means having a function of holding the battery cover with the housing without adding an exclusive component. Therefore, the number of components need not increase.

Since a recessed portion need not be formed in the battery storage chamber, unlike in the prior invention, the outer appearance of the housing will not be adversely affected.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF PREFERRED EMBODIMENT

A preferred embodiment of the present invention will be described with reference to the accompanying drawings.

Figure 1:
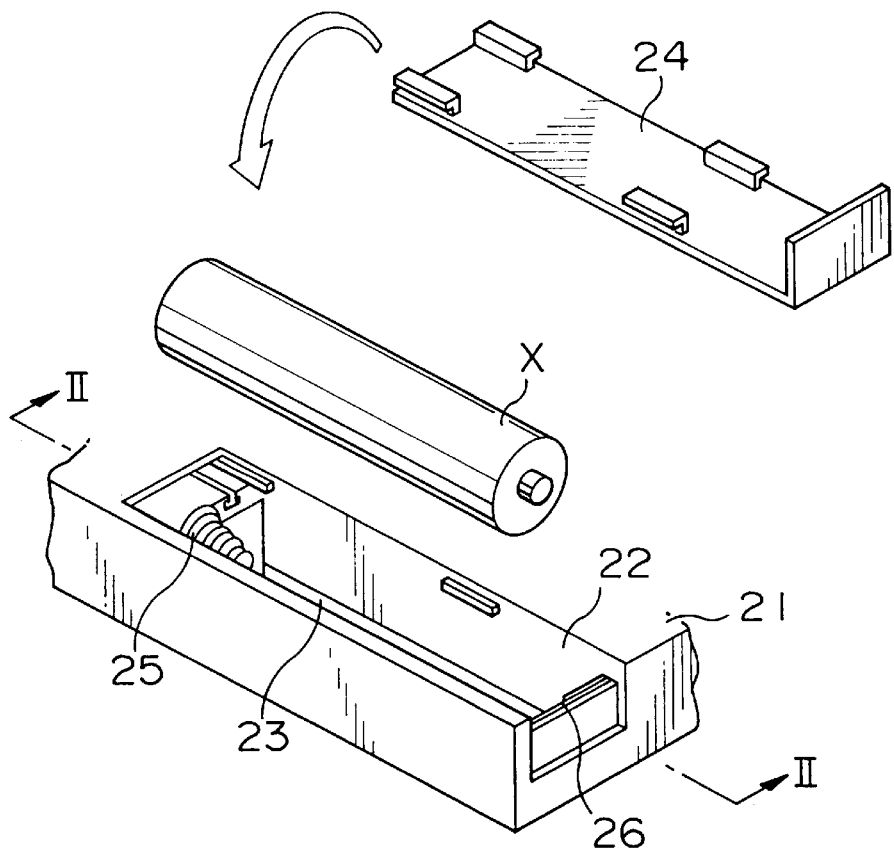
FIG. 1 is a schematic exploded perspective view showing an example of the structure of a conventional battery storage portion.
Figure 2:
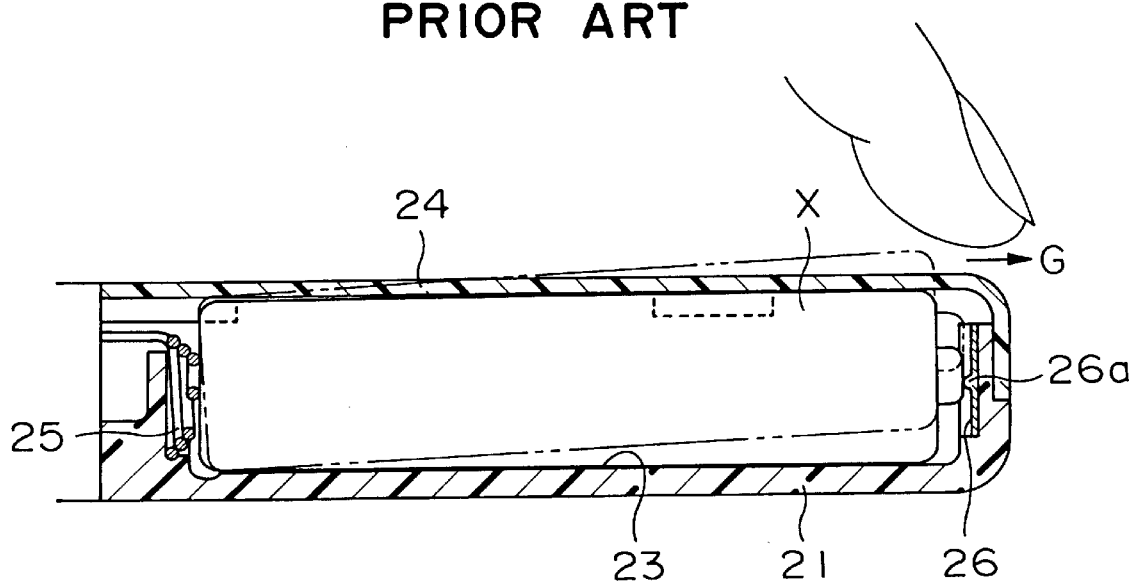
FIG. 2 is a longitudinal sectional view taken along the line II—II of FIG. 1.
Figure 3:
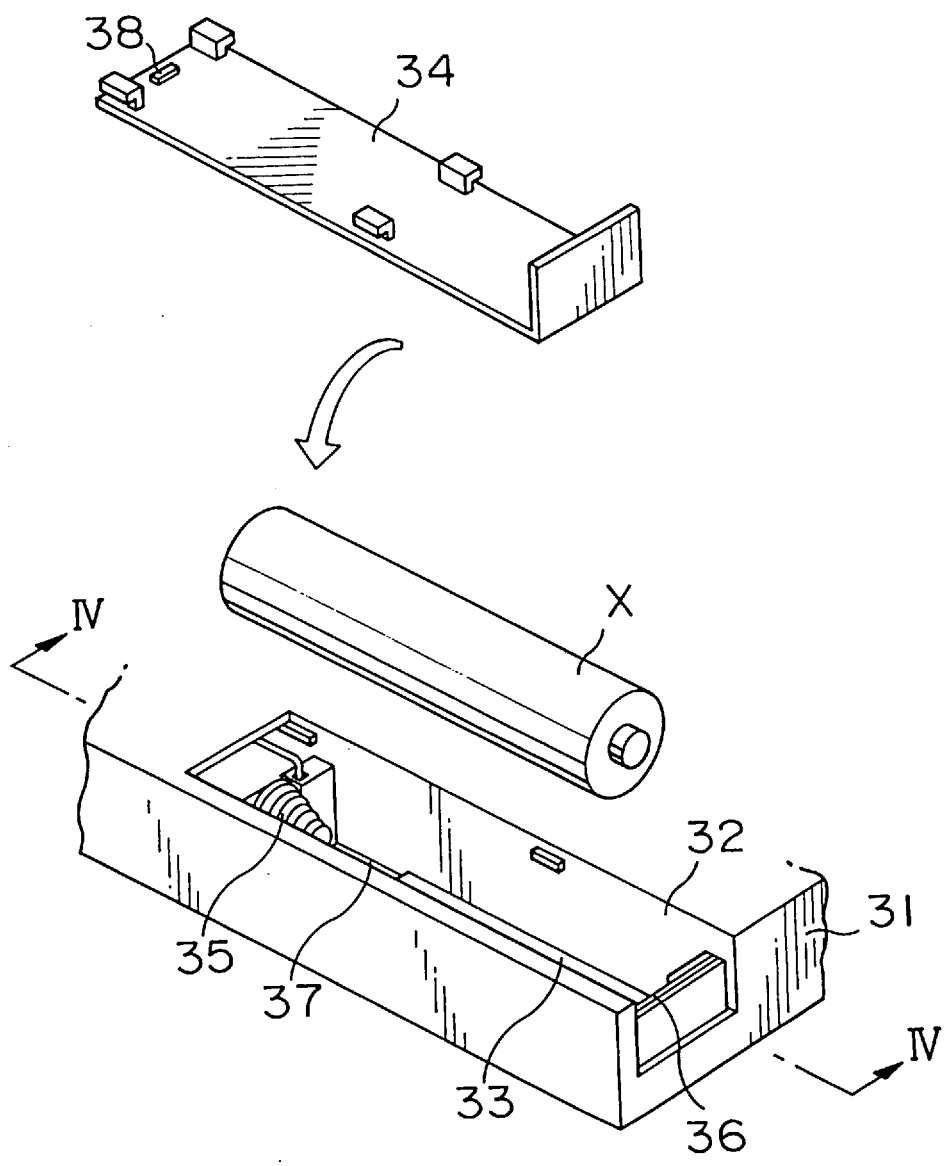
FIG. 3 is a schematic exploded perspective view showing the structure of a battery storage portion according to a prior invention which is an improvement over the conventional example shown in FIG. 1.
Figure 4A:
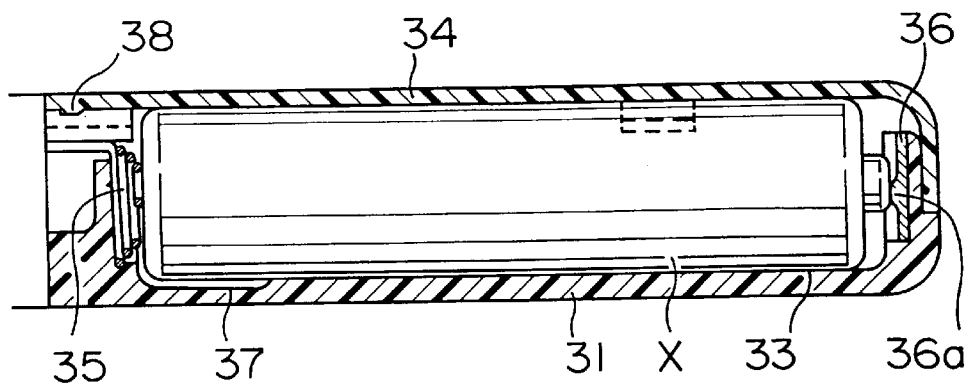
FIGS. 4A to 4C are sectional views taken along the line IV—IV of FIG. 3. to show three different states.
Figure 4B:
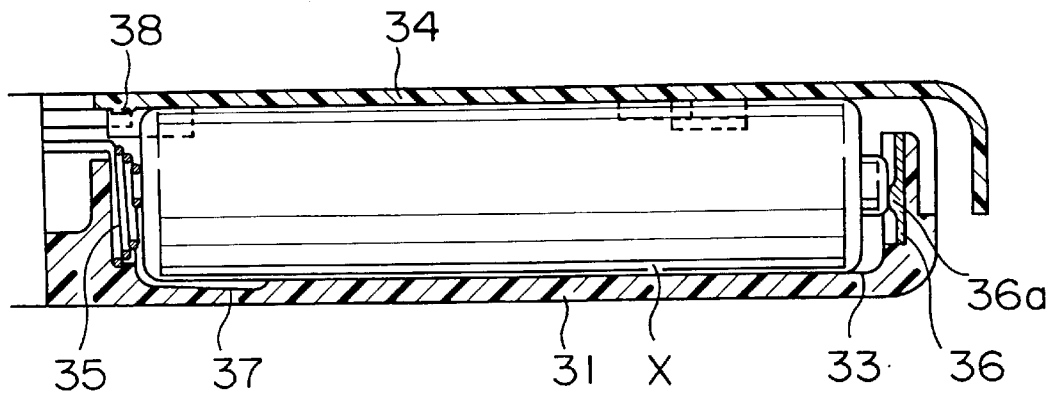
Figure 4C:
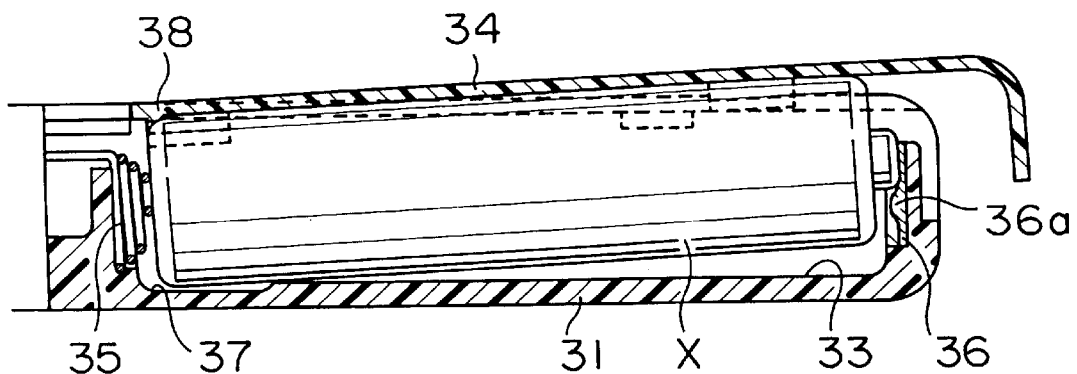
Figure 5:
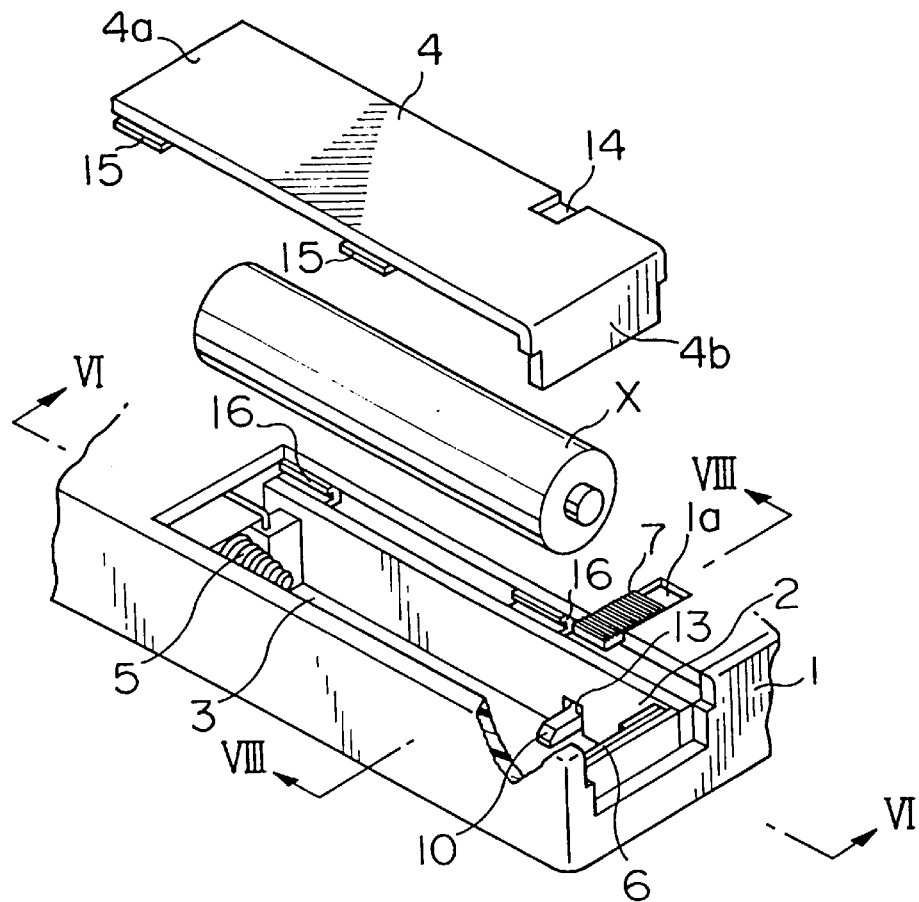
FIG. 5 is a schematic exploded perspective view showing an embodiment of the present invention.

FIGS. 5 to 8C show an embodiment of the present invention. FIG. 5 is an exploded perspective view showing the structure of a battery storage portion according to the present invention. An opening 2 having a size matching a battery to be stored is formed in part of a housing 1, and a battery storage chamber 3 for storing the battery is formed to oppose this opening 2. The battery storage chamber 3 is a parallelepiped with one side having a size larger than the height of the battery to be stored and two other sides slightly larger than the diameter of the battery. The opening 2 can be closed with a battery cover 4 matching the size of the opening 2. A coiled negative spring terminal 5 which comes into elastic contact with the negative terminal of a battery X and a positive terminal 6 which comes into tight contact with the positive terminal of the battery X are arranged on the two end portions of the battery storage chamber 3. A square opening portion 13 for a battery push-out piece is formed in the side wall surface of the battery storage chamber 3 near the positive terminal 6 to be adjacent to the bottom surface of the battery storage chamber 3. Engaging projections 16 are formed at positions of the battery storage chamber 3 near the opening 2.

The battery cover 4 is formed by combining two thin plates into an L shape. The thin plate having a large area is a main plate portion 4a and the thin plate having a small area is a side plate portion 4b. An engaging recessed portion 14 is formed in the upper surface of the main plate portion 4a, and a plurality of L-shaped engaging pawls 15 are formed on the lower surface of the main plate portion 4a. When the engaging pawls 15 and the engaging projections 16 respectively engage with each other, the battery cover 4 can fixedly close the opening 2, so that the stored battery will not be dropped while the outer appearance of the housing 1 will not be impaired.

Figure 6:
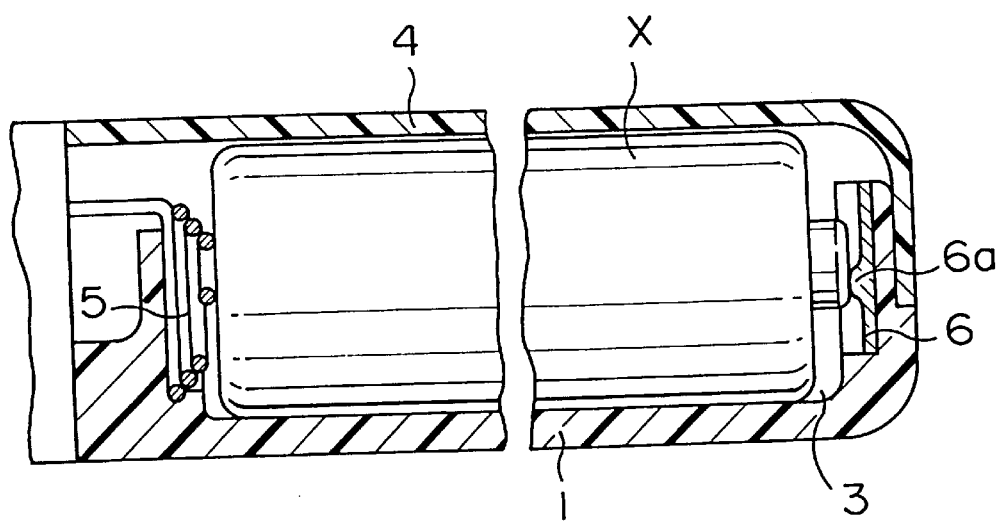
FIG. 6 is a sectional view taken along the line VI—VI of FIG. 5.

FIG. 6 is a sectional view taken along the line VI—VI of FIG. 5. When the battery X is stored in the battery storage chamber 3, it is held as its positive terminal is urged by a projection 6a projecting from the positive terminal 6 with the elasticity of the negative spring terminal 5.

Figure 7:
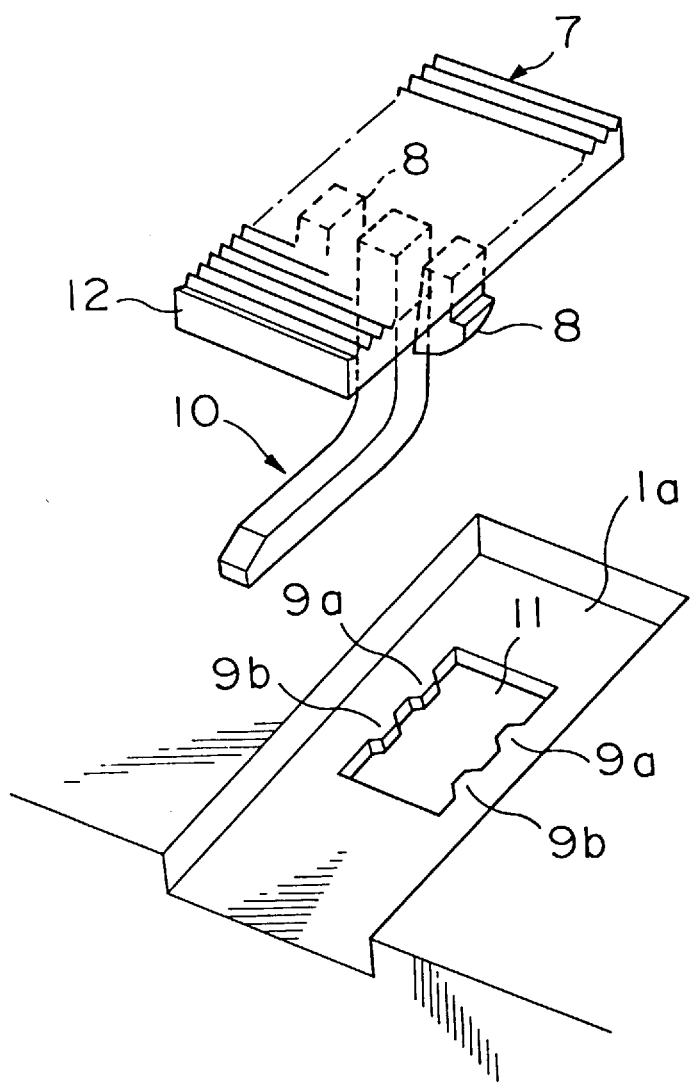
FIG. 7 is an exploded perspective view for explaining the engaging relationship between a lock handle used in the embodiment of the present invention and the housing of the electronic equipment.

As shown in FIG. 7, a lock handle 7 is constituted by an outer plate portion 12, a pair of engaging hooks 8 formed on the lower surface of the outer plate portion 12, and an L-shaped battery push-out piece 10 extending from the lower surface of the outer plate portion 12. An indent is formed in the surface of the outer plate portion 12 to be parallel to the short sides of the outer plate portion 12. The pair of engaging hooks 8 and the battery push-out piece 10 are substantially arranged on a straight line parallel to the short sides of the outer plate portion 12 and are integrally fixed on the lower surface of the outer plate portion 12. A recessed portion 1*a* having a shape substantially equal to that of the outer plate portion 12 is formed in the housing 1 at the lock handle mounting position. The recessed portion 1*a* opposes the opening 2 of the housing 1, and a substantially square lock handle mounting opening portion 11 is formed in this recessed portion 1*a*. Of the circumferential edge portion of the lock handle mounting opening portion 11, two sides parallel to the long sides of the outer plate portion 12 are formed with a plurality of pairs of trapezoidal engaging projections 9*a* and 9*b* projecting toward the lock handle mounting opening portion 11.

Figure 8A:
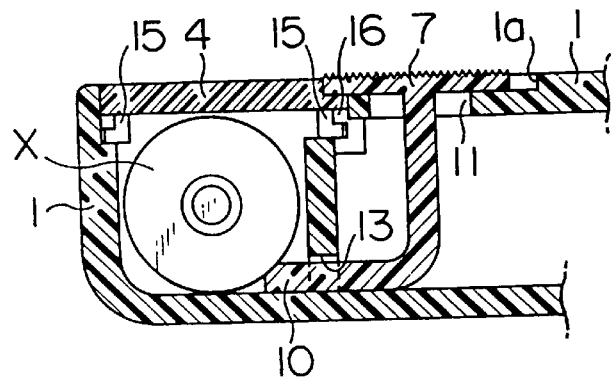
FIGS. 8A to 8C are sectional views taken along the line VIII—VIII of FIG. 5 to show three different states.
Figure 8B:
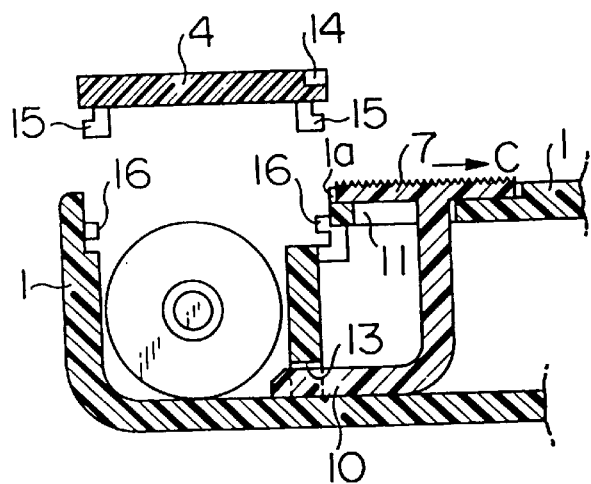
Figure 8C:
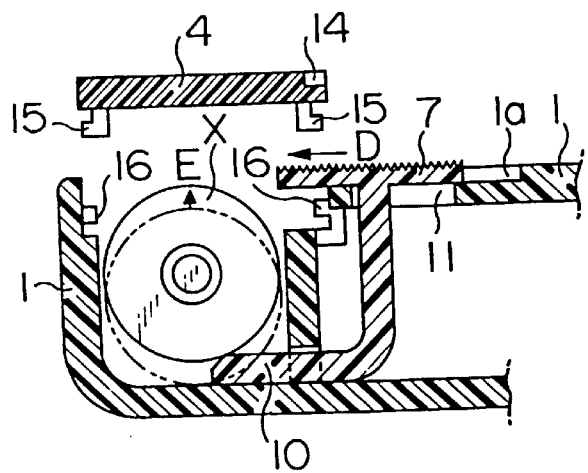

When the lock handle 7 is pressed into the lock handle mounting opening portion 11 of the housing 1, the engaging hooks 8 engage with the circumferential edge of the lock handle mounting opening portion 11 to hold the lock handle 7 in the housing 1. In this state, the lock handle 7 can slide in a direction perpendicular to the longitudinal direction of the battery X stored in the housing 1. When the lock handle 7 is slid, the lock handle 7 is stably held at three positions shown in FIGS. 8A to 8C showing the sectional views taken along the line VIII—VIII of FIG. 5, with the elastic force generated when the engaging hooks 8 ride over the engaging projections 9*a* and 9*b*. At this time, the battery push-out piece 10 extends through the opening portion 13 formed in the battery storage chamber 3.

FIGS. 8A to 8C show the operation of the battery storage structure of the present invention. FIG. 8A shows a state wherein the battery X is stored in the housing 1. The outer plate portion 12 of the lock handle 7 engages with the engaging recessed portion 14 of the battery cover 4 to fix the battery cover 4 in the housing 1. When the battery cover 4 is fixed in the housing 1, the movable range of the lock handle 7 is limited by the engaging recessed portion 14 of the battery cover 4, and the battery push-out piece 10 will not push out the battery X from the housing 1. At this time, the lock handle 7 is set still at the intermediate position of the movable range.

FIG. 8B shows a state wherein the battery cover 4 and the lock handle 7 are disengaged from each other. To remove the battery X, the lock handle 7 is slid in a direction C in FIG. 8B to disengage the outer plate portion 12 and the engaging recessed portion 14 from each other. Subsequently, the battery cover 4 is slid vertically to the side plate portion 4*b* to disengage the engaging pawls 15 and the engaging projections 16 from each other, and the battery X is removed from the housing 1. At this time, the lock handle 7 is set still on the right-end side (in the drawings) of the movable range.

FIG. 8C shows a state wherein the battery X is pushed out from the housing 1 by the battery push-out piece 10. After the battery cover 4 is removed from the housing 1, when the lock handle 7 is slid in a direction D in FIG. 8C, the battery cover 4 that interferes with the movement of the lock handle 7 is removed. For this reason, the lock handle 7 can slide toward the battery X over the engaging position of the engaging recessed portion 14 of the battery cover 4, and the distal end of the battery push-out piece 10 is inserted between the outer surface of the positive terminal of the battery X and the surface of the battery storage chamber 3 that opposes the opening 2. At this time, the lock handle 7 is set still on the left-end side (in the drawings) of the movable range. As a result, the positive terminal of the battery X is pushed out in a direction E in FIG. 8C. With the negative spring terminal 5 which is in elastic contact with the negative terminal of the battery X, the battery X is held as its positive terminal projects from the battery storage chamber 3. In this state, the battery X can be easily removed from the housing 1.

Therefore, according to the structure of the present invention, in addition to the operations and effects described above, the battery cover 4 is locked by the housing 1 through engagement between the engaging pawls 15 and the engaging projections 16 on its lower surface side, and is locked by the lock handle 7 on its upper surface side. Even if the electronic equipment is jumped due to an external impact, the battery cover 4 will not remove from the housing 1, and accordingly the battery will not suddenly pop out of the battery storage portion.

What I claim is:

1. A structure of a battery storage portion for an electronic equipment, having a battery storage chamber which opens in a housing of said electronic equipment to store a battery, a battery cover which closes said opening of said battery storage chamber, and lock handle means which engages with said battery cover to prevent said battery cover from dropping from said housing, wherein said lock handle means comprises a battery push-out piece projecting into said battery storage chamber to push out said battery which is stored in a direction toward said opening of said battery storage chamber.

2. A structure according to claim 1, wherein said housing of said electronic equipment is formed with a lock handle mounting opening portion for fitting said lock handle means therein, and said lock handle means is mounted on said housing of said electronic equipment to be slidable in a direction parallel to an end face of said stored battery.

3. A structure according to claim 1, wherein said lock handle means is constituted by an outer plate portion engageable with said battery cover, engaging hooks formed on a lower surface of said outer plate portion to engage with side surface portions of a lock handle mounting opening portion formed in said housing, and said battery push-out piece extending from said lower surface of said outer plate portion, and said battery push-out piece extends through a lock handle mounting opening portion formed in said housing and an opening portion for said battery push-out piece which is formed in said battery storage chamber.

4. A structure according to claim 3, wherein said side surface portions of said lock handle mounting opening portion are formed with a plurality of engaging projections, and said lock handle means can be set at a plurality of positions by engaging said engaging projections and said engaging hooks with each other.

* * * * *